(12) United States Patent  (10) Patent No.: US 9,189,828 B2
Gorchetchnikov et al.  (45) Date of Patent: *Nov. 17, 2015

(54) GRAPHIC PROCESSOR BASED ACCELERATOR SYSTEM AND METHOD

(71) Applicant: Neurala Inc., Boston, MA (US)

(72) Inventors: Anatoli Gorchetchnikov, Boston, MA (US); Heather Marie Ames, South Boston, MA (US); Massimiliano Versace, South Boston, MA (US); Fabrizio Santini, Jamaica Plain, MA (US)

(73) Assignee: Neurala, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,015

(22) Filed: Jan. 3, 2014

(65) Prior Publication Data

US 2014/0192073 A1 Jul. 10, 2014

Related U.S. Application Data

(63) Continuation of application No. 11/860,254, filed on Sep. 24, 2007, now Pat. No. 8,648,867.

(60) Provisional application No. 60/826,892, filed on Sep. 25, 2006.

(51) Int. Cl.
*G06T 1/60* (2006.01)
*G06F 9/50* (2006.01)
*G06T 1/20* (2006.01)

(52) U.S. Cl.
CPC ............... *G06T 1/60* (2013.01); *G06F 9/5027* (2013.01); *G06T 1/20* (2013.01); *G06F 2209/509* (2013.01)

(58) Field of Classification Search
CPC ........................................................ G06T 1/60
USPC .......... 345/501, 503, 530, 531, 535; 348/739; 712/225
See application file for complete search history.

(56) References Cited

U.S. PATENT DOCUMENTS

| | | | |
|---|---|---|---|
| 5,388,206 A | 2/1995 | Poulton et al. | |
| 7,861,060 B1 * | 12/2010 | Nickolls et al. | 712/22 |
| 8,648,867 B2 * | 2/2014 | Gorchetchnikov et al. | 345/501 |
| 2005/0166042 A1 | 7/2005 | Evans | |
| 2007/0052713 A1 | 3/2007 | Chung et al. | |
| 2007/0279429 A1 | 12/2007 | Ganzer | |

* cited by examiner

*Primary Examiner* — Maurice L McDowell, Jr.
(74) *Attorney, Agent, or Firm* — Cooley LLP

(57) ABSTRACT

An accelerator system is implemented on an expansion card comprising a printed circuit board having (a) one or more graphics processing units (GPUs), (b) two or more associated memory banks (logically or physically partitioned), (c) a specialized controller, and (d) a local bus providing signal coupling compatible with the PCI industry standards. The controller handles most of the primitive operations to set up and control GPU computation. Thus, the computer's central processing unit (CPU) can be dedicated to other tasks. In this case a few controls (simulation start and stop signals from the CPU and the simulation completion signal back to CPU), GPU programs and input/output data are exchanged between CPU and the expansion card. Moreover, since on every time step of the simulation the results from the previous time step are used but not changed, the results are preferably transferred back to CPU in parallel with the computation.

20 Claims, 5 Drawing Sheets

GRAPHIC PROCESSOR BASED ACCELERATOR SYSTEM AND METHOD

RELATED APPLICATIONS

The present application claims a priority benefit, under 35 U.S.C. §120, as a continuation of U.S. application Ser. No. 11/860,254, now U.S. Pat. No. 8,648,867 B2, filed Sep. 24, 2007, entitled "Graphic Processor Based Accelerator System and Method," which claims the priority benefit, under 35 U.S.C. §119(e), of U.S. Application No. 60/826,892, filed Sep. 25, 2006. Each of the above-identified applications is incorporated herein by reference in its entirety.

BACKGROUND

Graphics Processing Units (GPUs) are found in video adapters (graphic cards) of most personal computers (PCs), video game consoles, workstations, etc. and are considered highly parallel processors dedicated to fast computation of graphical content. With the advances of the computer and console gaming industries, the need for efficient manipulation and display of 3D graphics has accelerated the development of GPUs.

In addition, manufacturers of GPUs have included general purpose programmability into the GPU architecture leading to the increased popularity of using GPUs for highly parallelizable and computationally expensive algorithms outside of the computer graphics domain. When implemented on conventional video card architectures, these general purpose GPU (GPGPU) applications are not able to achieve optimal performance, however. There is overhead for graphics-related features and algorithms that are not necessary for these non-video applications.

SUMMARY

Numerical simulations, e.g., finite element analysis, of large systems of similar elements (e.g. neural networks, genetic algorithms, particle systems, mechanical systems) are one example of an application that can benefit from GPGPU computation. During numerical simulations, disk and user input/output can be performed independently of computation because these two processes require interactions with peripheral hardware (disk, screen, keyboard, mouse, etc) and put relatively low load on the central processing unit/system (CPU). Complete independence is not desirable, however; user input might affect how the computation is performed and even interrupt it if necessary. Furthermore, the user output and the disk output are dependent on the results of the computation. A reasonable solution would be to separate input/output into threads, so that it is interacting with hardware occurs in parallel with the computation. In this case whatever CPU processing is required for input/output should be designed so that it provides the synchronization with computation.

In the case of GPGPU, the computation itself is performed outside of the CPU, so the complete system comprises three "peripheral" components: user interactive hardware, disk hardware, and computational hardware. The central processing unit (CPU) establishes communication and synchronization between peripherals. Each of the peripherals is preferably controlled by a dedicated thread that is executed in parallel with minimal interactions and dependencies on the other threads.

A GPU on a conventional video card is usually controlled through OpenGL, DirectX, or similar graphic application programming interfaces (APIs). Such APIs establish the context of graphic operations, within which all calls to the GPU are made. This context only works when initialized within the same thread of execution that uses it. As a result, in a preferred embodiment, the context is initialized within a computational thread. This creates complications, however, in the interaction between the user interface thread that changes parameters of simulations and the computational thread that uses these parameters.

A solution as proposed here is an implementation of the computational stream of execution in hardware, so that thread and context initialization are replaced by hardware initialization. This hardware implementation includes an expansion card comprising a printed circuit board having (a) one or more graphics processing units, (b) two or more associated memory banks that are logically or physically partitioned, (c) a specialized controller, and (d) a local bus providing signal coupling compatible with the PCI industry standards (this includes but is not limited to PCI-Express, PCI-X, USB 2.0, or functionally similar technologies). The controller handles most of the primitive operations needed to set up and control GPU computation. As a result, the CPU is freed from this function and is dedicated to other tasks. In this case a few controls (simulation start and stop signals from the CPU and the simulation completion signal back to CPU), GPU programs and input/output data are the information exchanged between CPU and the expansion card. Moreover, since on every time step of the simulation the results from the previous time step are used but not changed, the results are preferably transferred back to CPU in parallel with the computation.

In general, according to one aspect, the invention features a computer system. This system comprises a central processing unit, main memory accessed by the central processing unit, and a video system for driving a video monitor in response to the central processing unit as is common. The computer system further comprises an accelerator that uses input data from and provides output data to the central processing unit. This accelerator comprises at least one graphics processing unit, accelerator memory for the graphic processing unit, and an accelerator controller that moves the input data into the at least one graphics processing unit and the accelerator memory to generate the output data.

In the preferred, the central processing unit transfers the input data for a simulation to the accelerator, after which the accelerator executes simulation computations to generate the output data, which is transferred to the central processing unit. Preferably, the accelerator controller dictates an order of execution of instructions to the at least one graphics processing unit. The use of the separate controller enables data transfer during execution such that the accelerator controller transfers output data from the accelerator memory to main memory of the central processing unit.

In the preferred embodiment, the accelerator controller comprises an interface controller that enables the accelerator to communicate over a bus of the computer system with the central processing unit.

In general according to another aspect, the invention also features an accelerator system for a computer system, which comprises at least one graphics processing unit, accelerator memory for the graphic processing unit and an accelerator controller for moving data between the at least one graphics processing unit and the accelerator memory.

In general according to another aspect, the invention also features a method for performing numerical simulations in a computer system. This method comprises a central processing unit loading input data into an accelerator system from main memory of the central processing unit and an accelerator controller transferring the input data to a graphics processing unit with instructions to be performed on the input data. The accelerator controller then transfers output data generated by the graphic processing unit to the central processing unit as output data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION

Figure 1:
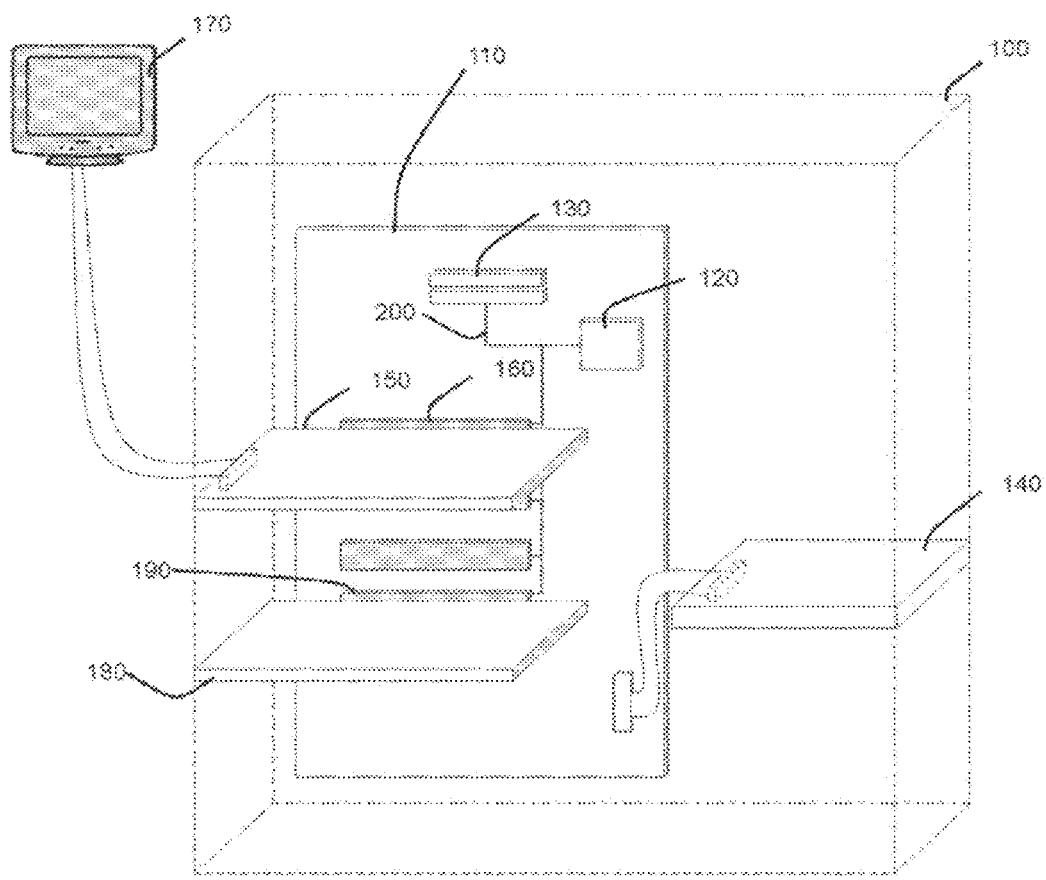
FIG. 1 is a schematic diagram illustrating a computer system including the GPU accelerator according to an embodiment of the present invention.

FIG. 1 shows a computer system 100 that has been constructed according to the principles of the present invention.

In more detail, the computer system 100 in one example is a standard personal computer (PC). However, this only serves as an example environment as computing environment 100 does not necessarily depend on or require any combination of the components that are illustrated and described herein. In fact, there are many other suitable computing environments for this invention, including, but not limited to, workstations, server computers, supercomputers, notebook computers, hand-held electronic devices such as cell phones, mp3 players, or personal digital assistants (PDAs), multiprocessor systems, programmable consumer electronics, networks of any of the above-mentioned computing devices, and distributed computing environments that including any of the above-mentioned computing devices.

In one implementation the GPU accelerator is implemented as an expansion card 180 includes connections with the motherboard 110, on which the one or more CPU's 120 are installed along with main, or system memory 130 and mass/non volatile data storage 140, such as hard drive or redundant array of independent drives (RAID) array, for the computer system 100. In the current example, the expansion card 180 communicates to the motherboard 110 via a local bus 190. This local bus 190 could be PCI, PCI Express, PCI-X, or any other functionally similar technology (depending upon the availability on the motherboard 110). An external version GPU accelerator is also a possible implementation. In this example, the external GPU accelerator is connected to the motherboard 110 through USB-2.0, IEEE 1394 (Firewire), or similar external/peripheral device interface.

The CPU 120 and the system memory 130 on the motherboard 110 and the mass data storage system 140 are preferably independent of the expansion card 180 and only communicate with each other and the expansion card 180 through the system bus 200 located in the motherboard 110. A system bus 200 in current generations of computers have bandwidths from 3.2 GB/s (Pentium 4 with AGTL+, Athlon XP with EV6) to around 15 GB/s (Xeon Woodcrest with AGTL+, Athlon 64/Opteron with Hypertransport), while the local bus has maximal peak data transfer rates of 4 GB/s (PCI Express 16) or 2 GB/s (PCI-X 2.0). Thus the local bus 190 becomes a bottleneck in the information exchange between the system bus 200 and the expansion card 180. The design of the expansion card and methods proposed herein minimizes the data transfer through the local bus 190 to reduce the effect of this bottleneck.

The system memory 130 is referred to as the main random-access memory (RAM) in the description herein. However, this is not intended to limit the system memory 130 to only RAM technology. Other possible computer storage media include, but are not limited to ROM, EEPROM, flash memory, or any other memory technology.

In the illustrated example, the GPU accelerator system is implemented on an expansion card 180 on which the one or more GPU's 240 are mounted. It should be noted that the GPU accelerator system GPU 240 is separate from and independent of any GPU on the standard video card 150 or other video driving hardware such as integrated graphics systems. Thus the computations performed on the expansion card 180 do not interfere with graphics display (including but not limited to manipulation and rendering of images).

Various brand of GPU are relevant. Under current technology, GPU's based on the GeForce series from NVIDIA Corporation or the Catalyst series from ATI/Advanced Micro Devices, Inc.

The output to a video monitor 170 is preferably through the video card 150 and not the GPU accelerator system 180. The video card 150 is dedicated to the transfer of graphical information and connects to the motherboard 110 through a local bus 160 that is sometimes physically separate from the local bus 190 that connects the expansion card 180 to the motherboard 110.

Figure 2:
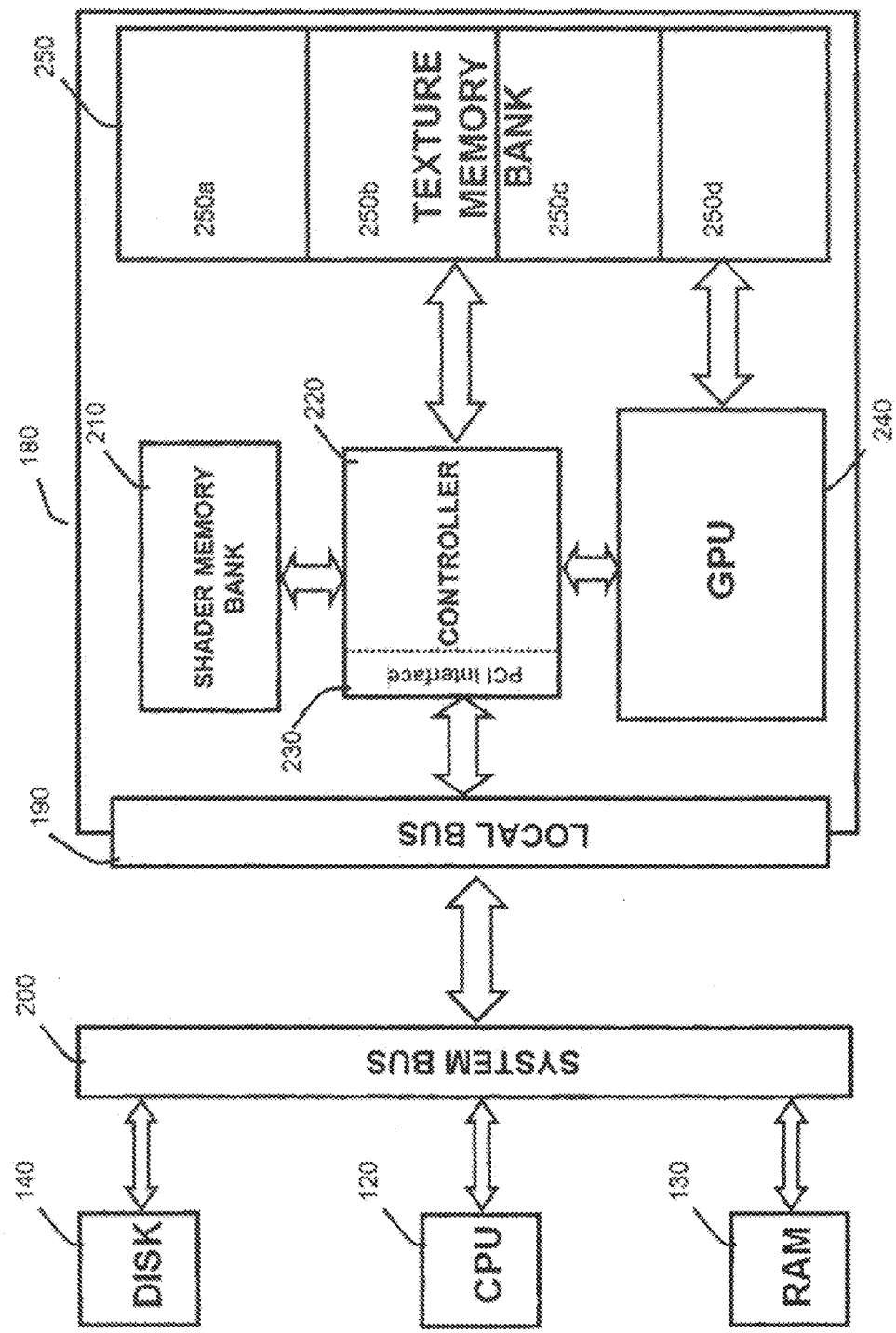
FIG. 2 is block diagram illustrating the architecture for the GPU accelerator according to an embodiment of the present invention.

FIG. 2 is a block diagram illustrating the general architecture of the GPU accelerator system and specifically the expansion card 180 in which at least one GPU 240 and associated memories 210 and 250 are mounted. Electrical (signal) and mechanical coupling with a local bus 190 provides signal coupling compatible with the PCI industry standards (this includes but is not limited to PCI, PCI-X, PCI Express, or functionally similar technology).

The GPU accelerator further preferably comprises one specifically designed accelerator controller 220. Depending upon the implementation, the accelerator controller 220 is field programmable gate array (FPGA) logic, or custom built application-specific (ASIC) chip mounted in the expansion card 180, and in mechanical and signal coupling with the GPU 240 and the associated memories 210 and 250. During initial design, a controller can be partially or even fully implemented in software, in one example.

The controller 220 commands the storage and retrieval of arrays of data (on a conventional video card the arrays of data are represented as textures, hence the term 'texture' in this document refers to a data array unless specified otherwise and each element of the texture is a pixel of color information), execution of GPU programs (on a conventional video card these programs are called shaders, hence the term 'shader' in this document refers to a GPU program unless specified otherwise), and data transfer between the system bus 200 and the expansion card 180 through the local bus 190 which allows communication between the main CPU 120, RAM 130, and disk 140.

Two memory banks 210 and 250 are mounted on the expansion card 180. In some example, these memory banks separated in the hardware, as shown, or alternatively implemented as a single, logically partitioned memory component.

The reason to separate the memory into two partitions 210 250 stems from the nature of the computations to which the GPU accelerator system is applied. The elements of computation (computational elements) are characterized by a single output variable. Such computational elements often include one or more equations. Computational elements are same or similar within a large population and are computed in parallel. An example of such a population is a layer of neurons in an artificial neural network (ANN), where all neurons are described by the same equation. As a result, some data and most of the algorithms are common to all computational elements within population, while most of the data and some algorithms are specific for each equation. Thus, one memory, the shader memory bank 210, is used to store the shaders needed for the execution of the required computations and the parameters that are common for all computational elements and is coupled with the controller 220 only. The second memory, the texture memory bank 250, is used to store all the necessary data that are specific for every computational element (including, but not limited to, input data, output data, intermediate results, and parameters) and is coupled with both the controller 220 and the GPU 240.

The texture memory bank 250 is preferably further partitioned into four sections. The first partition 250a is designed to hold the external input data patterns. The second partition 250b is designed to hold the data textures representing internal variables. The third partition 250c is designed to hold the data textures used as input at a particular computation step on the GPU 240. The fourth partition 250d holds the data textures used to accommodate the output of a particular computational step on the GPU 240. This partitioning scheme can be done logically, does not require hardware implementation. Also the partitioning scheme is also altered based on new designs or needs of the algorithms being employed. The reason for this partitioning is further explained in the Data Organization section, below.

A local bus interface 230 on the controller 220 serves as a driver that allows the controller 220 to communicate through the local bus 190 with the system bus 200 and thus the CPU 120 and RAM 130. This local bus interface 230 is not intended to be limited to PCI related technology. Other drivers can be used to interface with comparable technology as a local bus 190.

Data Organization

Each computational element discussed above has output variables that affect the rest of the system. For example in the case of a neural network it is the output of a neuron. A computational element also usually has several internal variables that are used to compute output variables, but are not exposed to the rest of the system, not even to other elements of the same population, typically. Each of these variables is represented as a texture. The important difference between output variables and internal variables is their access.

Output variables are usually accessed by any element in the system during every time step. The value of the output variable that is accessed by other elements of the system corresponds to the value computed on the previous, not the current, time step. This is realized by dedicating two textures to output variables—one holds the value computed during the previous time step and is accessible to all computational elements during the current time step, another is not accessible to other elements and is used to accumulate new values for the variable computed during the current time step. In-between time steps these two textures are switched, so that newly accumulated values serve as accessible input during the next time step, while the old input is replaced with new values of the variable. This switch is implemented by swapping the address pointers to respective textures as described in the System and Framework section.

Internal variables are computed and used within the same computational element. There is no chance of a race condition in which the value is used before it is computed or after it has already changed on the next time step because within an element the processing is sequential. Therefore, it is possible to render the new value of internal variable into the same texture where the old was read from in the texture memory bank. Rendering to more than one texture from a single shader is not implemented in current GPU architectures, so computational elements that track internal variables would have to have one shader per variable. These shaders can be executed in order with internal variables computed first, followed by output variables.

Further savings of texture memory is achieved through using multiple color components per pixel (texture element) to hold data. Textures can have up to four color components that are all processed in parallel on a GPU. Thus, to maximize the use of GPU architecture it is desirable to pack the data in such a way that all four components are used by the algorithm. Even though each computational element can have multiple variables, designating one texture pixel per element is ineffective because internal variables require one texture and output variables require two textures. Furthermore, different element types have different numbers of variables and unless this number is precisely a multiple of four, texture memory can be wasted.

Figure 5:
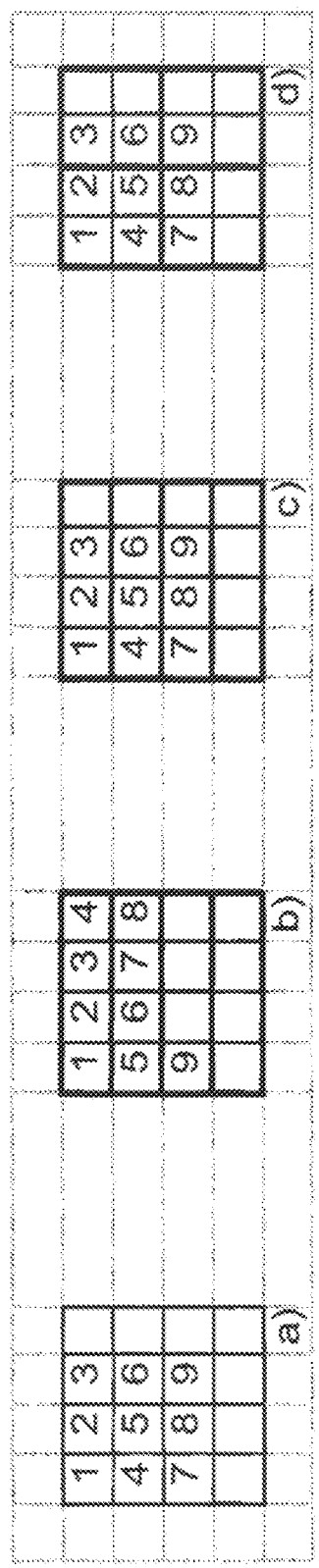
FIG. 5 is an example population of nine computational elements arranged in a 3×3 square and a potential packing scheme for texture pixels, according to an implementation of the present invention.

A more reasonable packing scheme would be to pack four computational elements into a pixel and have separate textures for every variable associated with each computational element. In this case the packing scheme is identical for all textures, and therefore can be accessed using the same algorithm. Several ways to approach this packing scheme are outlined here. An example population of nine computational elements arranged in a 3×3 square (FIG. 5a) can be packed by element (FIG. 5b), by row (FIG. 5c), or by square (FIG. 5d).

Packing by element (FIG. 5b) means that elements 1,2,3,4 go into first pixel; 5,6,7,8 go into second pixel; 9 goes into third pixel. This is the most compact scheme, but not convenient because the geometrical relationship is not preserved during packing and its extraction depends on the size of the population.

Packing by row (column; FIG. 5c) means that elements 1,2,3 go into pixel (1,1); 3,4,5 go into pixel (2,1), 7,8,9 go into pixel (3,1). With this scheme the element's y coordinate in the population is the pixel's y coordinate, while the element's x coordinate in the population is the pixel's x coordinate times four plus the index of color component. Five by five populations in this case will use 2×5 texture, or 10 pixels. Five of these pixels will only use one out of four components, so it wastes 37.5% of this texture. 25×1 population will use 6×1 texture (six pixels) and will waste 12.5% of it.

Packing by square (FIG. 5d) means that elements 1,2,4,5 go into pixel (1,1); 3,6 go into pixel (1,2); 7,8 go into pixel (2,1), and 9 goes into pixel (2,2). Both the row and the column of the element are determined from the row (column) of the pixel times two plus the second (first) bit of the color component index. Five by five populations in this case will use 3×3 texture, or 9 pixels. Four of these pixels will only use two out of four components, and one will only use one component, so it wastes 34.4% of this texture. This is more advantageous than packing by row, since the texture is smaller and the waste is also lower. 25×1 population on the other hand will use 13×1 texture (thirteen pixels) and waste >50% of it, which is much worse than packing by row.

In order to eliminate waste altogether the population should have even dimensions in the square packing, and it should have a number of columns divisible by four in row packing. Theoretically, the chances are approximately equivalent for both of these cases to occur, so the particular task and data sizes should determine which packing scheme is preferable in each individual case.

The System and Framework

Figure 3:
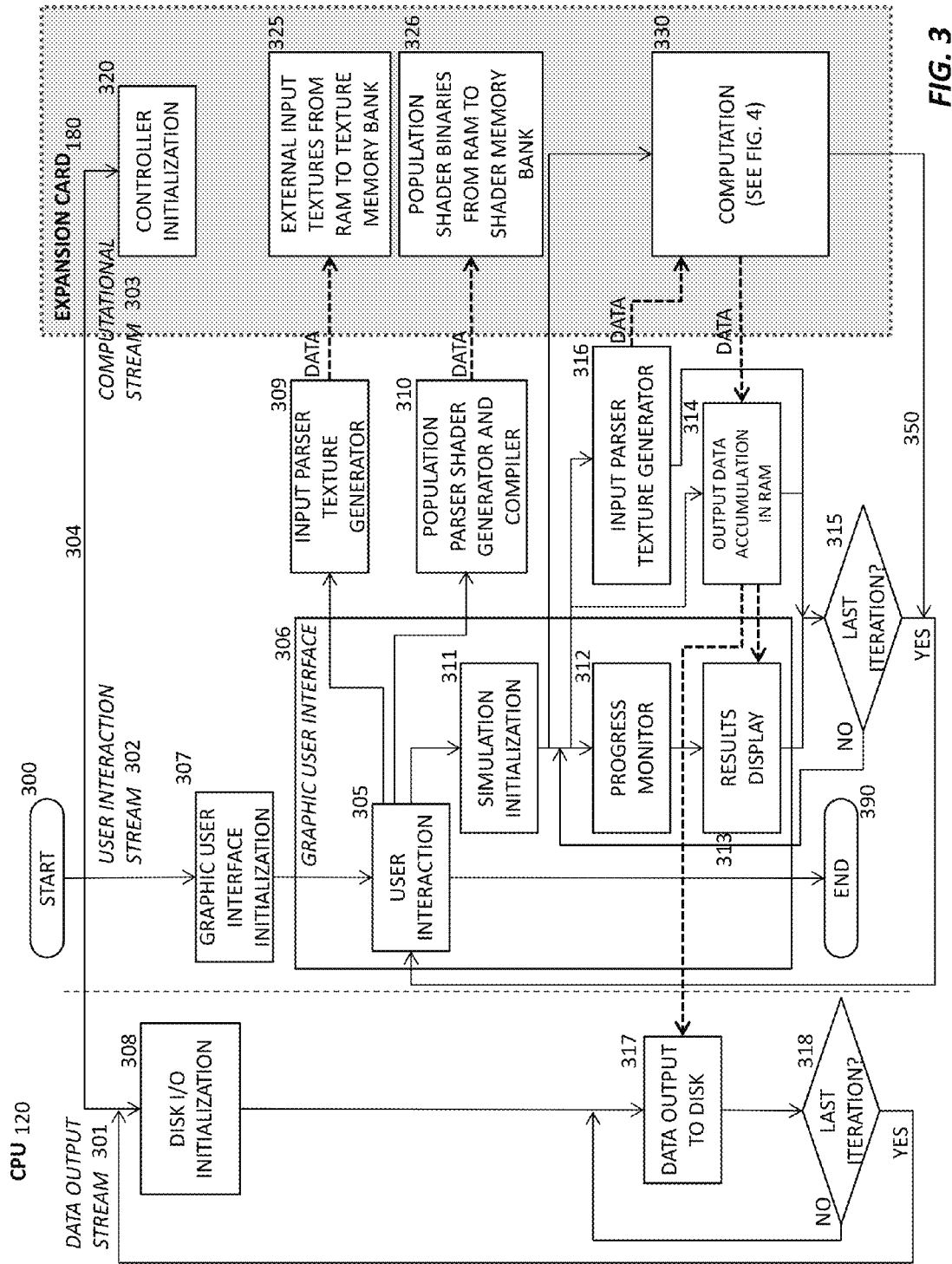
FIG. 3 is a block/flow diagram illustrating an exemplary implementation of the top level control of the GPU accelerator system.

FIG. 3 shows an exemplary implementation of the top level system and method that is used to control the computation. It is a representation of one of several ways in which a system and method for processing numerical techniques can be implemented in the invention described herein and so the implementation is not intended to be limited to the following description and accompanying figure.

The method presented herein includes two execution streams that run on the CPU 120—User Interaction Stream 302 and Data Output Stream 301. These two streams preferably do not interact directly, but depend on the same data accumulated during simulations. They can be implemented as separate threads with shared memory access and executed on different CPUs in the case of multi-CPU computing environment. The third execution stream—Computational Stream 303—runs on the GPU accelerator of the expansion card 180 and interacts with the User Interaction Stream 302 through initialization routines and data exchange in between simulations. The Computational Stream 303 interacts with the User Interaction Stream and the Data Output Stream through synchronization procedures during simulations.

The crucial feature of the interaction between the User Interaction Stream 302 and the Computational Stream 303 is the shift of priorities. Outside of the simulation, the system 100 is driven by the user input, thus the User Interaction Stream 302 has the priority and controls the data exchange 304 between streams. After the user starts the simulation, the Computational Stream 303 takes the priority and controls the data exchange between streams until the simulation is finished or interrupted 350.

The user starts 300 the framework through the means of an operating system and interacts with the software through the user interaction section 305 of the graphic user interface 306 executed on the CPU 120. The start 300 of the implementation begins with a user action that causes a GUI initialization 307, Disk input/output initialization 308 on the CPU 120, and controller initialization 320 of the GPU accelerator on the expansion card 180. GUI initialization includes opening of the main application window and setting the interface tools that allow the user to control the framework. Disk I/O initialization can be performed at the start of the framework, or at the start of each individual simulation.

The user interaction 305 controls the setting and editing of the computational elements, parameters, and sources of external inputs. It specifies which equations should have their output saved to disk and/or displayed on the screen. It allows the user to start and stop the simulation. And it performs standard interface functions such as file loading and saving, interactive help, general preferences and others.

The user interaction 305 directs the CPU 120 to acquire the new external input textures needed (this includes but is not limited to loading from disk 140 or receiving them in real time from a recording device), parses them if necessary 309, and initializes their transfer to the expansion card 180, where they are stored 325 in the texture memory bank 250 by the controller 220. The user interaction 305 also directs the CPU 120 to parse populations of elements that will be used in the simulation, convert them to GPU programs (shaders), compile them 310, and initializes their transfer to the expansion card 180, where they are stored 326 in the shader memory bank 210 by the controller 220. This operation is accompanied by the upload 309 of the initial data into the input partition of the texture memory bank 250, and stores the shader order of execution in the controller 220. The user can perform operations 309 and 310 as many times as necessary prior to starting the simulation or between simulations.

The editing of the system between simulations is difficult to accomplish without the hardware implementation of the computational thread suggested herein. The system of equations (computational elements) is represented by textures that track variables plus shaders that define processing algorithms. As mentioned above, textures, shaders and other graphics related constructs can only be initialized within the rendering context, which is thread specific. Therefore textures and shaders can only be initialized in the computational thread.

Network editing is a user-interactive process, which according to the scheme suggested above happens in the User Interaction Stream 302. The simulation software thus has to take the new parameters from the User Interaction Stream 302, communicate them to the Computational Stream 303 and regenerate the necessary shaders and textures. This is hard to accomplish without a hardware implementation of the Computational Stream 303. The Computational Stream 303 is forked from the User Interaction Stream and it can access the memory of the parent thread, but the reverse communication is harder to achieve. The controller 220 allows operations 309 and 310 to be performed as many times as necessary by providing the necessary communication to the User Interaction Stream 302.

After execution of the input parser texture generation 309 and population parser shader generator and compiler 310 are performed at least once, the user has the option to initialize the simulation 311. During this initialization the main control of the framework is transferred to the GPU accelerator system's accelerator controller 220 and computation 330 is started (see FIG. 4; 420). The user retains the ability to interrupt the simulation, change the input, or to change the display properties of the framework, but these interactions are queued to be performed at times determined by the controller-driven data exchange 314 and 316 to avoid the corruption of the data.

The progress monitor 312 is not necessary for performance, but adds convenience. It displays the percentage of completed time steps of the simulation and allows the user to plan the schedule using the estimates of the simulation wall clock times. Controller-driven data exchange 314 updates the display of the results 313. Online screen output for the user selected population allows the user to monitor the activity and evaluate the qualitative behavior of the network. Simulations with unsatisfactory behavior can be terminated early to change parameters and restart. Controller-driven data exchange 314 also drives the output of the results to disk 317. Data output to disk for convenience can be done on an element per file basis. A suggested file format includes a leftmost column that displays a simulated time for each of the simulation steps and subsequent columns that display variable values during this time step in all elements with identical equations (e.g. all neurons in a layer of a neural network).

Controller-driven data exchange or input parser texture generator 316 allows the user to change input that is generated on the fly during the simulation. This allows the framework monitoring of the input that is coming from a recording device (video camera, microphone, cell recording electrode, etc) in real time. Similar to the initial input parser 309, it preprocesses the input into a universal format of the data array suitable for texture generation and generates textures. Unlike the initial parser 309, here the textures are transferred to hardware not whenever ready but upon the request of the controller 220.

The controller 220 also drives the conditional testing 315 and 318 informs the CPU-bound streams whether the simulation is finished. If so, the control returns to the User Interaction Stream. The user then can change parameters or inputs (309 and 310), restart the simulation (311) or quit the framework (390).

SANNDRA (Synchronous Artificial Neuronal Network Distributed Runtime Algorithm; http://www.kinness.net/Docs/SANNDRA/html) was developed to accelerate and optimize processing of numerical integration of large non-homogenous systems of differential equations. This library is fully reworked in its version 2.x.x to support multiple computational backends including those based on multicore CPUs, GPUs and other processing systems. GPU based backend for SANNDRA-2.x.x can serve as an example practical software implementation of the method and architecture described above and pictorially represented in FIG. 3.

To use SANNDRA, the application should create a TSimulator object either directly or through inheritance. This object will handle global simulation properties and control the User Interaction Stream, Data Output Stream, and Computational Stream. Through TSimulator::timestep( ), TSimulator::outfileInterval( ), and TSimulator::outmode( ), the application can set the time step of the simulation, the time step of disk output, and the mode of the disk output. The external input pattern should be packed into a TPattern object and bound to the simulation object through TSimulator::resetInputs( ) method. TSimulator::simLength( ) sets the length of the simulation.

The second step is to create at least one population of equations (Tpopulation object). Population holds one equation object TEquation. This object contains only a formula and does not hold element-specific data, so all elements of the population can share single TEquation.

The TEquation object is converted to a GPU program before execution. GPU programs have to be executed within a graphical context, which is stream specific. TSimulator creates this context within a Computational Stream, therefore all programs and data arrays that are necessary for computation have to be initialized within Computational Stream. Constructor of TPopulation is called from User Interaction Stream, so no GPU-related objects can be initialized in this constructor.

TPopulation::fillElements( ) is a virtual method designed to overcome this difficulty. It is called from within the Computational Stream after TSimulator::networkCreate( ) is called in the User Interaction Stream. A user has to override TPopulation::fillElements( ) to create TEquation and other computation related objects both element independent and element-specific. Element independent objects include subcomponents of TEquation and objects that describe how to handle interdependencies between variables implemented through derivatives of TGate class.

Element-specific data is held in TElement objects. These objects hold references to TEquation and a set of TGate objects. There is one TElement per population, but the size of data arrays within this object corresponds to population size. All TElement objects have to be added to the TSimulator list of elements by calling TSimulator::addUnit( ) method from TPopulation::fillElements( ).

Finally, TPopulation::fillElements( ) should contain a set of TElement::add*Dependency( ) calls for each element. Each of these calls sets a corresponding dependency for every TGate object. Here TGate object holds element independent part of dependency and TElement::add*Dependency( ) sets element-specific details.

System provided TPopulation handles the output of computational elements, both when they need to exchange the data and when they need to output it to disk. User implementation of TPopulation derivative can add screen output.

Listing 1 is an example code of the user program that uses a recurrent competitive field (RCF) equation:

Listing 1

```
uint16_t w = 3, h = 3;
static float m_compet = 0.5;
static float m_persist = 1.0;
class TCablePopRCF : public TPopulation
{
TEq_RCF* m_equation;
TGate* m_gate1;
TGate* m_gate2;
void createGatingStructure( )
{
m_gate1 = new TGate(0);
m_gate2 = new TGate(1);
};
void createUnitStructure(TBasicUnit* u)
{
u->addO2OPInputDependency(m_gate1, 0., 0., 0.004, 0., 0, 0);
u->addFullDependency(m_gate2, population( ));
}
public: TCablePopRCF( ) : TPopulation("compCPU RCF", w, h, true) { };
~TCablePopRCF( ) {if(m_equation) delete m_equation;
    if(m_gate1) delete m_gate1;
    if(m_gate2) delete m_gate2;};
bool fillElements(TSimulator* sim);
};
bool TCablePopRCF::fillElements(TSimulatior* sim)
{
m_equation = new TEq_RCF(this, m_compet, m_persist);
createGatingStructure( );
for(size_t i = 0; i < xSize( ); ++i)
for(size_t j = 0; j < ySize( ); ++j)
{
TElement* u = new TCPUElement(this, m_equation, i, j);
sim->addUnit(u);
createUnitStructure(u);
}
Return true;
}
int
main( )
{
// Input pattern generation (309 in FIG.3)
uint32_t* pat = new uint32_t[w*h];
TRandom<float> randGen (0);
for(uint32_t I = 0; I < w*h; ++i)
pat[i] = randGen.random( );
Tpattern* p = new Tpattern(pat, w, h);
// Setting up the simulation
TSimulator* cableSim = new TSimulator("data"); //(308 and 320 in FIG. 3)
```

Listing 1

```
cableSim->timestep(0.05); //(320 in FIG. 3)
cableSim->resetInputs(p); //(325 in FIG. 3)
cableSim->outfileInterval(0.1); //(308 in FIG. 3)
cableSim->outmode(SANNDRA::timefunc); //(308 in FIG. 3)
cableSim->simLength(60.0); //(320 in FIG. 3)
// Preparing the population
TPopulation* cablePop = new TCablePopRCF( ); //(310 in FIG. 3)
cableSim->networkCreate( ); //(326 in FIG. 3)
uint16_t user= 1;
while(user)
{
if(! cableSim->simulationStart(true, 1)) //(311 in FIG. 3)
exit(1);
std::cout<<"Repeat?\n"; //(305 in FIG. 3)
std::cin>>user; //(305 in FIG. 3)
if(user == 1)
cableSim->networkReset( ); //(305 in FIG. 3)
{
If(cableSim)
Delete cableSim; //Also deletes cablePop and its internals
exit(0);
};
```

Figure 4:
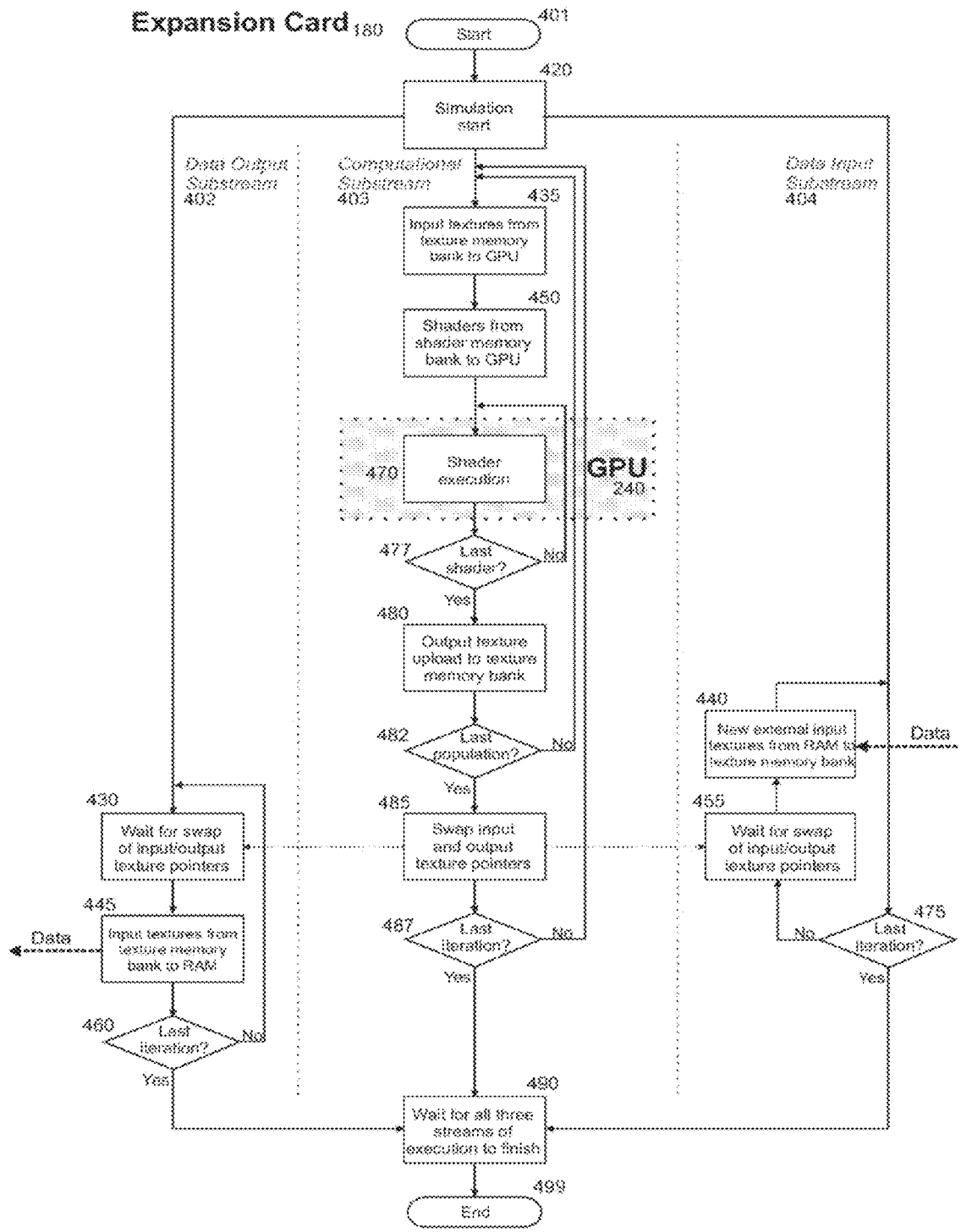
FIG. 4 is a flow diagram illustrating an exemplary implementation of the bottom level control of the GPU accelerator system that is used to execute the target computation.

FIG. 4 is a detailed flow diagram illustrating a part of an exemplary implementation of the bottom level system and method performed during the computation on the GPU accelerator of the expansion card 180 and is a more detailed view of the computational box 330 in FIG. 3. FIG. 4 is a representation of one of several ways in which a system and method for processing numerical techniques can be implemented.

With systems of equations that have complex interdependencies it is likely that the variable in some equation from a previous time step has to be used by some other equation after the new values of this variable are already computed for new time step. To avoid data confusion, the new values of variables should be rendered in a separate texture. After the time step is completed for all equations, these new values should be copied over old values so that they are used as input during the next time step. Copying textures is an expensive operation, computationally, but since the textures are referred to by texture IDs (pointers), swapping these pointers for input and output textures after each time step achieves the same result at a much lesser cost.

In the hardware solution suggested herein, ID swapping is equivalent to swapping the base memory address for two partitions of the texture memory bank 250. They are swapped 485 during synchronization (485, 430, and 455) so that data transfer 445 and the computation 435-487 proceeds immediately and in parallel with data transfer as shown in FIG. 4. A hardware solution allows this parallelism through access of the controller 220 to the onboard texture memory bank 250.

The main computation and data exchange are executed by the controller 220. It runs three parallel substreams of execution: Computational Substream 403, Data Output Substream 402, and Data Input Substream 404. These streams are synchronized with each other during the swap of pointers 485 to the input and output texture memory partitions of the texture memory bank 250 and the check for the last iteration 487. Algorithmically, these two operations are a single atomic operation, but the block diagram shows them as two separate blocks for clarity.

The Computational Substream 403 performs a computational cycle including a sequential execution of all shaders that were stored in the shader memory bank 210 using the appropriate input and output textures. To begin the simulation the controller 220 initializes three execution substreams 403, 402, and 404. On every simulation step, the Computational Substream 403 determines which textures the GPU 240 will need to perform the computations and initiates the upload 435 of them onto the GPU 240. The GPU 240 can communicate directly with the texture memory bank 250 to upload the appropriate texture to perform the computations. The controller 220 also pulls the first shader (known by the stored order) from the shader memory bank 210 and uploads 450 it onto the GPU 240.

The GPU 240 executes the following operations in this order: performs the computation (execution of the shader) 470; tells the controller 220 that it is done with the computations for the current shader; and after all shaders for this particular equation are executed sends 480 the output textures to the output portion of the texture memory bank 250. This cycle continues through all of the equations based on the branching step 482.

An example shader that performs fourth order Runge-Kutta numerical integration is shown in Listing 2 using GLSL notation;

Listing 2

```
uniform sampler2DRect Variable;
uniform float integration_step;
float halfstep = integration_step*0.5;
float fl_6step = integration_step/6.0;
vec4 output = texture2DRect(Variable, gl_TexCoord[0].st);
// define equation( ) here
vec4 rungekutta4(vec4 x)
{
const vec4 kl = equation(x);
const vec4 k2 = equation(x + halfstep*kl);
const vec4 k3 = equation(x + halfstep*k2);
const vec4 k4 = equation(x + integration step*k3);
return fl_6step*(kl + 2.0*(k2 + k3) + k4);
}
Void main(void)
{
output += rungekutta4(output);
gl_FragColor = output;
}
```

The shader in Listing 2 can be executed on conventional video card. Using the controller 220 this code can be further optimized, however. Since the integration step does not change during the simulation, the step itself as well as the halfstep and ⅙ of the step can be computed once per simulation, and updated in all shaders by a shader update procedures 310, 326 discussed above.

After all of the equations in the computational cycle are computed the main execution substream 403 on the controller 220 can switch 485 the reference pointers of the input and output portions of the texture memory bank 250.

The two other substreams of execution on the controller 220 are waiting (blocks 430 and 455, respectively) for this switch to begin their execution. The Data Input Substream 404 is controlling 440 the input of additional data from the CPU 120. This is necessary in cases where the simulation is monitoring the changing input, for example input from a video camera or other recording device in the real time. This substream uploads new external input from the CPU 120 to the texture memory bank 250 so it can be used by the main computational substream 403 on the next computational step and waits for the next iteration 475. The Data Output Substream 445 controls the output of simulation results to the CPU 120 if requested by the user. This substream uploads the results of the previous step to the main RAM 130 so that the CPU 120 can save them on disk 140 or show them on the results display 313 and waits for the next iteration 460.

Since the Computational Substream 403 determines the timing of input 440 and output 445 data transfers, these data transfers are driven by the controller 220. To further reduce the data transfer overhead (and disk 140 overhead also) the controller 220 initiates transfer only after selected computational steps. For example, if the experimental data that is simulated was recorded every 10 milliseconds (msec) and the simulation for better precision was computed every 1 msec, then only every tenth result has to be transferred to match the experimental frequency.

This solution stores two copies of output data, one in the expansion card texture memory bank 250 and another in the system RAM 130. The copy in the system RAM 130 is accessed twice: for disk I/O and screen visualization 313. An alternative solution would be to provide CPU 120 with a direct read access to the onboard texture memory bank 250 by mapping the memory of the hardware onto a global memory space. The alternative solution will double the communication through the local bus 190. Since the goal discussed herein is reducing the information transfer through the local bus 190, the former solution is favored.

The main substream 403 determines if this is the last iteration 487. If it is the last iteration, the controller 220 waits for the all of the execution substreams to finish 490 and then returns the control to the CPU 120, otherwise it begins the next computational cycle.

This repeats through all of the computational cycles of the simulation.

CONCLUSION

This GPU accelerator system offers the following potential advantages:

1. Limited computations on the CPU 120. The CPU 120 is only used for user input, sending information to the controller 220, receiving output after each computational cycle (or less frequently as defined by the user), writing this output to disk 140, and displaying this output on the monitor 170. This frees the CPU 120 to execute other applications and allows the expansion card to run at its full capacity without being slowed down by extensive interactions with the CPU 120.

2. Minimizing data transfer between the expansion card 180 and the system bus 200. All of the information needed to perform the simulations will be stored on the expansion card 180 and all simulations will take place on it. Furthermore, whatever data transfer remains necessary will take place in parallel with the computation, thus reducing the impact of this transfer on the performance.

3. New way to execute GPU programs (shaders). Previously, the CPU 120 had full control over the order of shader's execution and was required to produce specific commands on every cycle to tell the GPU 240 which shader to use. With the invention disclosed herein, shaders will initially be stored on the shader memory bank 210 on the expansion card 180 and will be sent to the GPU 240 for execution by the general purpose controller 220 located on the expansion card.

4. Multiple parallelisms. The GPU 240 is inherently parallel and is well suited to perform parallel computations. In parallel with the GPU 240 performing the next calculation, the controller 220 is uploading the data from the previous calculation into main memory 130. Furthermore, the CPU 120 at the same time uses uploaded previous results to save them onto disk 140 and to display them on the screen through the system bus 200.

5. Reuse of existing and affordable technology. All hardware used in the invention and mentioned here-in are based on currently available and reliable components. Further advance of these components will provide straightforward improvements of the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer system, comprising:
   a central processing unit to receive input data;
   main memory, operably coupled to the central processing unit via a bus, to store the input data received by the central processing unit;
   an accelerator, operably coupled to the central processing unit and the first memory via the bus, to receive at least a portion of the input data from the main memory, the accelerator comprising:
      at least one graphics processing unit to perform a sequence of computations on the at least a portion of the input data so as to generate output data, intermediate computations in the sequence of computations yielding intermediate results; and
      accelerator memory, operably coupled to the graphic processing unit, to store the results of the plurality of sequential computations; and
   a controller, operably coupled to the at least one graphics processing unit and the accelerator memory, to transfer the at least a portion of the input data into the accelerator memory, and to transfer at least a portion of the output data from the accelerator memory to the main memory during performance of the sequence of computations by the at least one graphic processing unit.

2. The computer system of claim 1, wherein the central processing unit is configured to receive the input data in response to a user interaction.

3. The computer system of claim 1, wherein:
   the central processing unit is configured to receive the input data at a first rate; and
   the at least one graphics processing unit is configured to perform the sequence of computations at a second rate different than the first rate.

4. The computer system of claim 1, wherein the main memory is configured to store a copy of the output data stored in the accelerator memory.

5. The computer system of claim 1, wherein an output of at least one computation in the sequence of computations represents an output of at least one neuron in an artificial neural network.

6. The computer system of claim 1, wherein accelerator memory comprises:
   a first memory bank to store parameters common to all of the computations in the sequence of computations; and
   a second memory bank to store data specific to at least one computation in the sequence of computations.

7. The computer system of claim 1, wherein the controller is configured to transfer the output data from the accelerator memory to the main memory without transferring any of the intermediate results from the accelerator memory to the main memory so as to reduce data transfer via the bus.

8. The computer system of claim 1, wherein the controller is configured to transfer at least a portion of the output data from the accelerator memory to the main memory after the at least one graphics processing unit has begun to perform another sequence of computations.

9. The computer system of claim 8, wherein the controller is configured to initiate transfer of the at least a portion of the input data and to transfer the at least a portion of the output data in parallel with performance of at least one computation in the other sequence of computations by the at least one graphics processing unit.

10. The computer system of claim 1, wherein the controller is configured to control execution of the sequence of computations by the at least one graphics processing unit.

11. The computer system of claim 1, further comprising:
at least one of a video camera, a microphone, or a cell recording electrode, operably coupled to the central processor unit, to acquire the input data in real time.

12. A method of performing a sequence of computations on a computer system comprising a central processing unit (CPU), a main memory operably coupled to the central processing unit via a bus, an accelerator operably coupled to the CPU and the main memory via the bus, the accelerator comprising a graphics processing unit (GPU) and an accelerator memory, the method comprising:
(A) performing, by the GPU, the sequence of computations on a first portion of the input data so as to generate a first portion of the output data, intermediate computations in the sequence of computations yielding intermediate results;
(B) in parallel with performing the sequence of computations by the GPU in (A), transferring a second portion of the input data from the main memory to the accelerator via the bus; and
(C) in parallel with performing the sequence of computations by the GPU in (A), transferring a second portion of the output data from the accelerator memory to the main memory via the bus.

13. The method of claim 12, further comprising:
storing the input data in the main memory in response to a user interaction.

14. The method of claim 12, further comprising:
receiving the input data at a first rate; and
wherein (A) comprises performing the sequence of computations at a second rate different than the first rate.

15. The method of claim 12, wherein (A) comprises:
generating an output representative of an output of at least one neuron in an artificial neural network.

16. The method of claim 12, wherein (C) comprises:
transferring the second portion of the output data from the accelerator memory to the main memory without transferring any of the intermediate results of the plurality of sequential computations from the accelerator memory to the main memory so as to reduce data transfer via the bus.

17. The method of claim 12, wherein (C) comprises:
transferring the second portion of the output data from the accelerator memory to the main memory after the GPU has begun to perform another sequence of computations.

18. The method of claim 17, wherein (C) further comprises:
initiating transfer of the second portion of the output data in parallel with performance of at least one computation in the other sequence of computations.

19. The method of claim 12, further comprising:
acquiring the input data in real time with at least one of a video camera, a microphone, or a cell recording electrode operably coupled to the CPU.

20. The method of claim 12, further comprising:
storing parameters common to all of the computations in the sequence of computations in a first memory bank in the accelerator memory; and
storing data specific to at least one computation in the sequence of computations in a second memory bank in the accelerator memory.

* * * * *